United States Patent [19]

Foure

[11] 4,324,718

[45] Apr. 13, 1982

[54] THERMAL STABILIZATION OF VINYL RESINS

[75] Inventor: Michel Foure, Artix, France

[73] Assignee: Societe Nationale Elf Aquitaine, France

[21] Appl. No.: 145,679

[22] Filed: May 1, 1980

[30] Foreign Application Priority Data

May 4, 1979 [FR] France ............... 79 11284

[51] Int. Cl.³ .................. C08K 5/36; C08K 5/46
[52] U.S. Cl. ........................ 524/108; 524/180
[58] Field of Search ............ 260/45.8 N, 45.8 SN, 260/45.8 A, 45.8 NZ, 45.8 NT, 45.75 S

[56] References Cited

U.S. PATENT DOCUMENTS

| | | | |
|---|---|---|---|
| 2,479,918 | 8/1949 | Fincke et al. | 260/45.75 |
| 2,726,227 | 12/1955 | Leistner et al. | 260/45.75 S |
| 2,726,254 | 12/1955 | Leistner et al. | 260/45.75 S |
| 2,888,435 | 5/1959 | Wallace | 260/45.75 S |
| 4,177,187 | 12/1979 | Bohen | 260/45.75 S |

FOREIGN PATENT DOCUMENTS 1008908 3/1966 Fed. Rep. of Germany.
2538409 12/1975 Fed. Rep. of Germany.

OTHER PUBLICATIONS

J. American Chem. Soc. 89, 2495 and 7017, 1967, C. J. Pedersen.

*Primary Examiner*—V. P. Hoke
*Attorney, Agent, or Firm*—Ostrolenk, Faber, Gerb & Soffen

[57] ABSTRACT

Thermal stabilization of halogeno-vinyl resins is achieved by the incorporation of one or more tetramercapto-tin compounds. The stabilization is improved by the addition of a crown compound, i.e. a cyclic polyether. The proportion of the crown compound is in general 10 to 200 parts by weight, preferably 25 to 100 parts, per 100 parts by weight of tin tetramercaptide.

19 Claims, No Drawings

THERMAL STABILIZATION OF VINYL RESINS

DESCRIPTION

The invention relates to the stabilization of vinyl resins by the addition of one or more organotin compounds. It relates particularly to improvement of the stabilizing effect as regards heat. The invention provides a stabilizing composition which contains both an organic tin derivative, particularly a tin tetramercaptide, and also an additive for improving the action of the tin compound. This composition can also include other known stabilizers.

Additives based on organic tin derivatives are currently employed for the stabilization of vinyl resins, particularly vinyl resins containing halogen, as is the case with polyvinyl chloride which is employed on a very large scale in industry. Since these stabilizers are employed, choices have to be made because the inhibitor effect upon decomposition of halogenated plastics materials varies substantially with the composition of the tin derivative additive. Thus, although certain mercaptides give good results, particularly those in which one or two sulphur atoms are connected to a tin atom, alkyl or other groups being connected to the other valences of the tin atom, difficulties arise when the stabilizer is a tetramercaptide. It is known that tin mercaptides give results which are often deceptive, the initial colour of the resin generally being excellent, but there being a sudden appearance of a marked colouration which nothing can prevent after a relatively short heating time. Also, tin tetramercaptides as stabilizers for polyvinyl chloride were only recommended a considerable time in the past. This is the case, for example, with U.S. Pat. Nos. 2,479,918, 2,726,227 and 2,888,435 and German Pat. No. 1008908. The disadvantage mentioned has been recognized industrially and attempts have been made to remedy it by the use of other additives, for example, gluconic, lactic, tartaric or ethylenediaminotetracetic acids, polyols, polyamines or organophosphores, with tin tetramercaptides or tetracarboxylates, according to German Pat. No. 2538409. However, no way has been found up to the present to make tin mercaptides truly utilizable with success and, generally, use has been made of other tin compounds, particularly mono-, di- or trimercaptides, which moreover themselves do not always give complete satisfaction.

The fact that tetramercaptides cannot be employed is particularly regrettable, because these substances are notably easier to prepare than the other tin derivatives. Their formation does not require the use of costly reactions, such as the Grignard synthesis, the Wurtz method of alumina synthesis, for example. The present invention allows the successful use of tetramercaptides. The invention thus affords the technical advantage of a better stabilization and an economic gain through the possibility of using tetramercaptides which are easy to prepare.

The new process according to the invention is characterized by adding to the resin to be stabilized one or more cyclic polyethers or "crown compounds", as well as one or more stabilizers based on tetramercapto-tin.

The novel composition according to the invention, for carrying out this process, is thus constituted by a mixture of at least one tetramercapto-tin compound and at least one crown compound.

The term "crown compound" is employed here with the meaning given to it by C. J. Pedersen (J. Am. Chem. Soc. 1976-89-7017-1967-89-2495) for designating cyclic polyethers, examples of the formulae of which are given below.

Crown compounds are known as complexing agents for organic synthesis, but there was nothing to indicate previously that they are capable of improving the stabilizing effect of mercapto-tin compounds in vinyl polymers, particularly halogeno vinyl polymers. It has thus been completely surprising to discover the efficacy of these special ethers in this application. It is possible, owing to their complexing power, that crown compounds block the Lewis acid derivatives of the tin tetrahalide, which are probably formed when the halogeno vinyl resin containing a tin compound is subjected to the action of heat. Perhaps they block $SnCl_4$ for example, which can be responsible for the browning of the resin when the stabilizer employed is a tin tetramercaptide. This is only a hypothesis without any relevance to the merits of the invention. In fact, nothing given in the prior art leads to the expectation that the presence of a crown compound would improve the stabilizing action of tin tetramercaptides.

As tetramercapto-tin compounds are known in the art, it is unnecessary to describe them here. It may be mentioned merely that it is particularly convenient to carry out the invention with those having a composition corresponding to the formula:

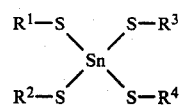

in which $R^1$ to $R^4$ are the same or different and each represents an alkyl, cycoalkyl, aryl, alkaryl or aliphatic ester group of the type:

$$R\text{—}COO\text{—}(CH_2)_n\text{—}$$

or $$R\text{—}OOC\text{—}(CH_2)_n\text{—}$$

where R is a $C_1$ to $C_{20}$ group, particularly $C_6$ to $C_{18}$, while n is 1 to 6 and preferably 1 to 3.

The number of carbon atoms in each of the groups $R^1$ to $R^4$ is 1 to 24 and, preferably, 6 to 20. For example, one or more of these groups are octyl, dodecyl, octadecyl, etc., e.g. isooctyl methylenecarboxylates, $$\text{—}CH_2COO\text{—}C_8H_{17}$$

2-ethyl-oxy palmitoyl $$C_{15}H_{31}COO\text{—}CH_2CH_2\text{—}$$

or similar.

Resins containing a halogen to which the invention is applied can be homopolymers, for example polyvinyl chloride, polyvinylidene chloride, polychlorotrifluoroethylene, polytetrafluoroethylene, polychloro-ethers and polydichlorostyrene etc., copolymers such as polyvinyl aceto-chloride or others or combinations or various mixtures, for example polyvinyl chlorides modified with ethylene and/or propylene, acrylonitrile-butadiene-styrene, ethylenevinyl acetate and similar resins.

As regards the crown compound utilizable according to the invention, they can be represented by the general formula $$\left[ \begin{array}{c} CH_2 \\ | \\ CH_2 \\ \diagdown O \end{array} \right]_x$$

where x is an integral number of at least 4. One or more oxygen atoms can be replaced by sulphur atoms and/or by nitrogen atoms.

It is customary to identify crown compounds by digits placed before and after "C", particularly n-C-n', where n designates the total number of atoms in the ring and n' designates the number of oxygen, sulphur and/or nitrogen atoms. For example, 12-C-4 designates a polyether ring containing 12 atoms, namely 4 oxygen atoms and 8 carbon atoms.

By way of non-limitative example, macrocyclic polyethers can be utilized, such as:
12-C-4 or 1,4,7,10-tetra-oxa-cyclododecane;
15-C-5 or 1,4,7,10,13-penta-oxa-cyclo-pentadecane;
18-C-6 or 1,4,7,10,13,16-hexa-oxa-cyclo-octadecane;
21-C-7 or 1,4,7,10,13,16,19-hepta-oxa-cyclo-heneicosane

15-C-5    18-C-6

Starting from these base models, various modifications are possible. The crown compounds can be substituted by one or more benzo groups or a naphtho group which may or may not be substituted. By way of example, reference can be made without the list being limitative to the following macrocyclic ethers:

benzo 12-C-4    naphtho 18-C-6 t-butyl-benzo-15-C-5    dibenzo-15-C-5

They can also be substituted with one or more cyclohexyl or decalyl groups which can themselves be substituted or unsubstituted. By way of example, the following compounds can be mentioned:

cyclohexyl-12-C-4 dicyclohexyl-30-C-10

They can also be substituted by one or more alkyl residues, for example:

(2,4,6,8-tetramethyl)-12-C-4.

The oxygen atoms can be separated by more than two carbon atoms, as in the following examples:

dicyclohexyl-14-C-4    dibenzo-20-C-4

In all the various compounds described above, all or some of the oxygen atoms can be replaced by sulphur atoms. By way of example and without this list being limitative, reference can be made to the following macrocycles:

benzotetrathia-12-C-4    hexathia-18-C-6

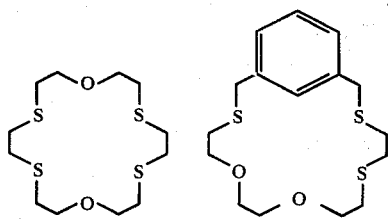

tetrathia-18-C-6    2,14-dithia-5,8,11-trioxa-metabenzenophenone

In order that the addition of the crown compound according to the invention is sufficiently effective, it is desirable for at least 0.1 mole of the cyclic ether to be used in the presence of 1 mole of tin derivative containing one tin atom. Preferably, the proportion is of the order of at least 0.5 mole of the ether per tin atom. Depending upon the molecular weights of the ether and the tin derivative utilized, the proportions by weight of these two compounds generally range from 10 to 200 parts by weight of the crown compound per 100 parts of organotin compound and preferably from 25 to 100 parts per 100 parts.

It will be understood that the crown compound can be incorporated in the resin to be stabilized with or separately from the tin stabilizer.

It is also to be noted that known stabilizers other than those derived from tin can be utilized in conjunction with the composition according to the invention. As in the case of standard stabilizers, both the amount of tin and the amount of the crown compound otherwise necessary can be reduced, by replacing them with a less costly thio-organic derivative.

By way of example, reference is made to the following additives:

(I) Thiomalic acid, the condensation products of thiomalic acid with ethylene glycol, in general, mercapto-substituted polycarboxylic acids and their condensation products with polyols, thio-anhydrides of the type $R_1COSCOR_2$, in which $R_1$ and $R_2$ are alkyl groups containing 6 to 20 carbon atoms, in particular thio-lauric acid anhydride, mercapto-acids of the general formula $HS-CH_2-_nCO_2H$ in which $n=1$ to 11, their esters of the type $HS\!-\!(CH_2\!)_n\!CO_2R_3$ in which $R_3$ is an alkyl group containing 1 to 18 carbon atoms, orthothiosalycyclic acid, heavy mercaptans of the formula $C_mH_{2m+1}SH$, m being greater than or equal to 12, (for example lauryl mercaptan or stearyl mercaptan), mercapto-alcohols of the type $HS-C_pH_{2p}-OH$, alkyl sulphides, aryl sulphides, sulphides comprising a group $$-\overset{O}{\underset{\|}{C}}-(CH_2)_2-S-(CH_2)_2-\overset{O}{\underset{\|}{C}}-,$$

alkylidene bis-(alkylmercaptides), for example $(CH_3)_2C(SR_3)$ in which $R_3$ is as defined above, and alkylidene bis-(mercapto esters) of the type $(CH_3)_2C[S(CH_2)_nCOOR_3]_2$, n and $R_3$ being as defined above;

(II) The disulphides $R_3-S-S-R_3$ and substituted disulphides of the type $R_3OCO(CH_2)_2-S-S-(CH_2)_2COOR_3$, where $R_3$ is as defined above, thioacetals and thioketals, in particular the thioketal of cyclohexanone and isooctyl mercaptoacetate and more generally compounds of the type

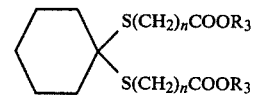

in which n and $R_3$ are as indicated above, heavy esters of thio-glycerol $HSCH_2-CHOH-CH_2OCOR_4$ or to $HSCH_2-\underset{\underset{OCOR_4}{|}}{CH}-CH_2OCOR_4$ heavy esters of mercaptoethanol, $R_4CO_2CH_2CH_2SH$, in which $R_4$ represents a hydrocarbon residue containing 8 to 20 carbon atoms as well as mercapto-ethanol esters of amido acids of the type:

$R_5-\underset{\underset{NHCOR_6}{|}}{CH}-COOCH_2CH_2SH$ where $R_5$ and $R_6$ are hydrocarbon residues containing 1 to 18 carbon atoms.

These products considerably improve the stabilizing power of the binary tin tetramercaptide/crown compound system, both as regards control of colour and of viscosity. Depending on the case with identical stabilization, from 20% to 90% can be saved of the binary system necessary when used alone.

The invention is illustrated by the non-limitative examples which follow. In these examples, samples of polyvinyl chloride containing a composition according to the invention and/or another stabilizer were subjected to colouration tests on heating. For this, the following mixture was calendered at 185° C. on a roller mixer:

100 parts by weight of polyvinyl chloride, known under the commercial name Lacqvyl SO715, having a coefficient of viscosity K=56;

0.5 part of E wax constituting the usual external lubricant;

x parts of tin stabilizer, the nature and quantity of which are indicated in each of the examples;

y parts of the crown compound.

The colouration of the resin was observed in each case and the times in minutes were noted both at the start of production of colouration and also on browning of the sample. The following table indicates the results obtained.

EXAMPLES 1 to 15

TABLE

| No | % Stabilizer | Time in mins until appearance of colour | | | |
|----|---|---|---|---|---|
| 1 | 0.45 $(C_{15}H_{31}COOCH_2CH_2S)_4Sn$ | Clear yellow | 5 | Dark brown or green | 7 |
| 2 | 0.45 $(C_{15}H_{31}COOCH_2CH_2S)_4Sn$ + 0.51 crown compound 18-C-6 | " | 5-6 | " | 20 |
| 3 | 0.3 $Bu_2Sn(SCH_2CO_2\text{-i.octyl})_2$ | " | 2 | " | 12 |

TABLE-continued

| No | % Stabilizer | | Time in mins until appearance of colour | | |
|---|---|---|---|---|---|
| 4 | 0.44 $(C_{12}H_{25}S)_4Sn$ | | " | 1 | Black | 9 |
| 5 | 0.44 $(C_{12}H_{25}S)_4Sn$ | ⎫ | | | | |
| | + 0.34 crown compound 12-C-4 | ⎭ | " | 3 | " | 14 |
| 6 | 0.45 $Sn(SCH_2CO_2\text{-}i.C_8H_{17})_4$ | | " | 4 | Dark brown | 5 |
| 7 | 0.45 $Sn(SCH_2CO_2\text{-}i.C_8H_{17})_4$ | ⎫ | | | | |
| | + 0.34 crown compound 12-C-4 | ⎭ | " | 6 | " | 7 |
| 8 | 0.45 $Sn(SCH_2CO_2\text{-}i.C_8H_{17})_4$ | ⎫ | | | | |
| | + 0.51 crown compound 18-C-6 | ⎭ | " | 8–9 | " | 18 |
| 9 | 0.09 $Sn(SCH_2CO_2\text{-}i.C_8H_{17})_4$ | ⎫ | | | | |
| | + 0.10 crown compound 18-C-6 | ⎬ | " | 9–10 | Dark Brown or green | 23 |
| | + 1.00 $C_{17}H_{35}COOCH_2CH_2SH$ | ⎭ | | | | |
| 10 | 1.00 $C_{17}H_{35}COOCH_2CH_2SH$(alone) | | Clear yellow | <1 | Dark brown or green | 3 |
| 11 | 0.09 $Sn(SCH_2CO_2\text{-}i.C_8H_{17})_4$ | ⎫ | | | | |
| | + 1.00 $C_{17}H_{35}COOCH_2CH_2SH$ | ⎭ | " | 8 | " | 10 |
| 12 | 0.09 $Sn(SCH_2CO_2\text{-}i.C_8H_{17})_4$ | ⎫ | | | | |
| | + 0.10 crown compound 18-C-6 | ⎭ | " | 2 | " | 14 |
| 13 | 0.35 $(C_8H_{17})_2Sn(SCH_2CO_2\text{-}i.C_8H_{17})_2$ | | " | 3 | " | 12 |
| 14 | 0.1 $(BuSnO_{1.5})_m$—$(BuSnS_{1.5})_n$(polymer) | | " | 8 | " | 12 |
| 15 | 0.35 crown compound 18-C-6 (alone) | | " | — | " | 1 |

Examples 1, 4 and 6 show that the tetramercaptides of tin alone are poor stabilizers. With the tetrakis-(2-oxyethylthio-palmitoyl) tin of Example 1, deep browning takes place in 7 minutes, but the addition of the crown compound 18-C-6, that is to say 1,4,7,10,13,16-hexaoxacyclooctadecane (Example 2), considerably improves the stability of the resin, the browning only appearing after 20 minutes. A similar improvement is shown by comparison of Examples 4 and 5, 6 and 8 and 9 and 11.

Example 9 shows the remarkable effect of the simultaneous addition of a crown compound and an ethyl mercaptan ester to a tin tetramercaptide. In contrast to Example 6, where the latter is employed alone and gives a notably insufficient stabilization, the double addition according to Example 9 gives a resin which is very stable to heat, with low proportions of the tetramercaptide and the crown compound. The comparative test 15 shows that the crown compound alone has no stabilizing effect.

EXAMPLE 16

This example shows the favourable effects of an additive according to the invention on the viscosity of polyvinyl chloride. The determinations in question were effected with a known Brabender apparatus which is a rotational couple rheometer. The apparatus registers the evolution of a couple on mixing the resin at a given temperature, as a function of time (it is described for example in Plastiques Modernes et Elastomeres, March 1975).

Tests were made on the polyvinyl chloride resin marketed under S 111 having a viscosity constant K=67. Certain agents were added to the resin in the following proportions:

| Polyvinyl chloride | 100 parts by weight |
|---|---|
| CaCO$_3$ | 3 parts by weight |
| TiO$_2$ | 1 parts by weight |
| E wax | 0.8 parts by weight |
| Stabilizer system | 1.65 parts $Sn(SCH_2CO_2\text{—i.}C_8H_{17})_4$ |
| | 1.60 parts crown compound 18-C-6 |

The test was carried out at 200° C. with a speed of rotation of the mixing rotor of 60 revs/min.

The visocosity curve recorded showed the existence of a very marked level region between the 4th and 13th minute, representing a couple of about 1.2 kg/m, which corresponds to the favourable conditions of working of the plastics material. This region was never observed with tin tetramercaptides employed alone. On the other hand, with known stabilizers, under the same conditions of operation, couples of the order of 1.5-1.6 kg/m are found, and the level regions are less clear.

Here are some examples of several tin tetramercaptides which may be used to perform the present invention:

tin tetrahexyltetramercaptide $(C_6H_{13}S)_4Sn$
tin tetraoctyltetramercaptide $(C_8H_{17}S)_4Sn$
tin (dimethyl-didecyl)tetramercaptide $(CH_3S)_2$—Sn—$(SC_{10}H_{21})_2$
tin (ethyl-trioctyl)tetramercaptide $C_2H_5S$—Sn—$(SC_8H_{17})_3$
tin tetramyristyl tetramercaptide $(C_{14}H_{29}S)_4Sn$
tin (dimethyl-dilauryl) tetramercaptide $(CH_3S)_2$—Sn—$(SC_{12}H_{25})_2$
tin (dibutyl-distearyl) tetramercaptide $(C_4H_9S)_2$—Sn—$(SC_{18}H_{37})_2$
tin (propyl-tristearyl) tetramercaptide $C_3H_7S$—Sn—$(SC_{18}H_{37})_3$
tin tetracyclohexyl tetramercaptide $(C_6H_{11}S)_4Sn$
tin (dicyclohexyl-dilauryl) tetramercaptide $(C_6H_{11}S)_2$—Sn—$(SC_{12}H_{25})_2$
tin (phenyl-trioctyl) tetramercaptide $C_6H_5S$—Sn—$(SC_8H_{17})_3$
tin (ditolyl-distearyl tetramercaptide $(C_7H_7S)_2$—Sn—$(SC_{18}H_{37})_2$
tin (dipentyl-dihexyl methylene carboxylate) tetramercaptide $(C_5H_{11}S)_2$—Sn—$(SCH_2COOC_6H_{13})_2$
tin (dioctyl-dihexyl ethylene carboxylate) tetramercaptide $(C_8H_{17}S)_2$—Sn—$(SCH_2CH_2COOC_6H_{13})_2$
tin tetra (lauryl ethylene carboxylate) tetramercaptide $Sn(CH_2CH_2COOC_{12}H_{25})_4$
tin [methyl-tri(stearyl methylene carboxylate)] tetramercaptide $CH_3S$—Sn—$(SCH_2COOC_{18}H_{37})_3$ tin tetra (ethyl hexyl acetate) tetramercaptide

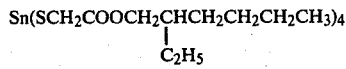

tin tetra (ethyl laurate) tetramercaptide Sn(SCH$_2$CH$_2$OOC—C$_{11}$H$_{23}$)$_4$ tin tetra (ethyl stearate) tetramercaptide Sn(SCH$_2$CH$_2$OOC—C$_{17}$H$_{35}$)$_4$ tin tetra (ethyl oleate) tetramercaptide Sn(SCH$_2$CH$_2$OOC—C$_{17}$H$_{33}$)$_4$ tin [ethyl-hexyl-(isopropyl oleate)]tetramercaptide

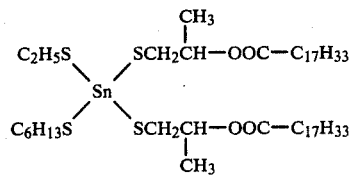

and the like, this list being not limitative.

I claim:

1. A method of stabilizing halo-vinyl resin by incorporating with the resin at least one tin tetramercaptide and at least one crown compound.

2. Method according to claim 1, wherein the tin tetra mercaptide has 24 to 72 carbon atoms, while the crown compound contains 8 to 30 carbon atoms and 4 to 10 oxygen atoms.

3. Method according to claim 1, wherein the tin tetramercaptide compound has 24 to 72 carbon atoms, while the crown compound contains 8 to 30 carbon atoms and respectively 4 to 10 metalloid atoms, the metalloids being selected from the group consisting of oxygen, sulfur and nitrogen.

4. Method according to claim 2, wherein the tin tetramercaptide has the formula:

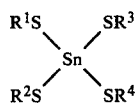

where R$^1$, R$^2$, R$^3$ and R$^4$ are organic groupings individually selected from the group consisting of alkyl, cycloalkyl, aryl, alkaryl R—COO(CH$_2$)$_n$—, the number of carbon atoms in each of the groupings R$^1$, R$^2$, R$^3$ and R$^4$ being 1 to 24 when there are alkyl, 5 to 24 when they are cycloalkyl, 6 to 24 when they are aryl, 7 to 24 when they are alkaryl and 3 to 24 when they are R—COO(CH$_2$)$_n$, whereas R has 1 to 20 carbon atoms while n is an integer of 1 to 6.

5. Method according to claim 4, wherein the tin tetramercaptide is

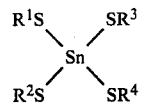

where R$^1$, R$^2$, R$^3$ and R$^4$ are alkyl having each 1 to 18 carbon atoms, the sum of the number of carbon atoms in the four alkyls being 24 to 72.

6. Method according to claim 4, wherein the tin tetra mercaptide is

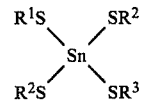

and at least a part of the groupings R$^1$, R$^2$, R$^3$ and R$^4$ are cycloalkyl, alkyl or alkaryl having each such a number of carbon atoms that the total number of carbon atoms is 24 to 72.

7. Method according to claim 4, in which the crown compound bears a benzo group.

8. Method according to claim 5, in which the crown compound bears a benzo group.

9. Method according to claim 4, in which the crown compound bears a cyclohexyl group.

10. Method according to claim 5, in which the crown compound bears a cyclohexyl group.

11. Method according to claim 4, wherein at least a part of the groupings R$^1$, R$^2$, R$^3$ and R$^4$ is constituted by R—OOC—(CH$_2$)$_n$—where R is an alkyl having 1 to 20 carbon atoms, n being an integer of 1 to 6.

12. Method according to claim 11, wherein R has 6 to 18 carbon atoms while n is 1 to 3.

13. Method according to claim 3, in which the amount of the crown compound is in the range of 10 to 200 parts by weight per 100 parts by weight of tin tetramercaptide.

14. Method according to claim 13, in which in addition a conventional organic thio-compound heat stabilizer is incorporated.

15. A halovinyl resin stabilized to heat which contains 0.09 to 1.65 percent by weight of a tin tetramercaptide the molecule of which contains 4 to 80 carbon atoms, and 0.1 to 1.6 percent by weight of a crown compound having 8 to 30 carbon atoms and 4 to 10 metalloid atoms selected from the group consisting of oxygen, sulfur and nitrogen.

16. Halovinyl resin according to claim 15 in which the molecule of the tin tetramercaptide contains 24 to 72 carbon atoms and said metalloid atoms are oxygen.

17. Halovinyl resin according to claim 16 in which the resin is polyvinyl chloride and the amount of crown compound is in the range of 10 to 200 parts by weight per 100 parts by weight of tin tetramercaptide.

18. Halovinyl resin according to claim 15 additionally containing a conventional organic thio-compound heat stabilizer.

19. Method according to claim 1, wherein the tin tetramercaptide is Sn(SCH$_2$CO$_2$—i.C$_8$H$_{17}$)$_4$ and in which the crown compound is 18-C-6 or 12-C-4.

* * * * *